US008971531B2

(12) United States Patent
Amirtharajan et al.

(10) Patent No.: US 8,971,531 B2
(45) Date of Patent: Mar. 3, 2015

(54) DATA EMBEDDING SYSTEM

(75) Inventors: Rengarajan Amirtharajan, Tamilnadu (IN); John Bosco Balaguru R, Tamilnadu (IN)

(73) Assignee: Sastra University, Tamilnadu (IN)

( * ) Notice: Subject to any disclaimer, the term of this patent is extended or adjusted under 35 U.S.C. 154(b) by 735 days.

(21) Appl. No.: 12/770,466

(22) Filed: Apr. 29, 2010

(65) Prior Publication Data

US 2011/0228943 A1 Sep. 22, 2011

(30) Foreign Application Priority Data

Mar. 17, 2010 (IN) ............................. 703/CHE/2010

(51) Int. Cl.
*H04L 29/06* (2006.01)
*H04K 1/06* (2006.01)

(52) U.S. Cl.
CPC ........................................ *H04K 1/06* (2013.01)
USPC ............. 380/54; 380/205; 380/210; 380/214; 380/219; 380/245; 380/250; 713/176

(58) Field of Classification Search
CPC ..... G06F 21/14; H04L 2209/34; H04L 45/00; H04L 49/3009; H04L 9/0858
USPC ........... 380/54, 205, 210, 214, 219, 245, 250; 382/100; 713/176
See application file for complete search history.

(56) References Cited

U.S. PATENT DOCUMENTS 5,644,645 A * 7/1997 Osuga ........................... 382/124
5,793,880 A * 8/1998 Constant ....................... 382/100
5,940,411 A * 8/1999 Takeda .......................... 714/701
6,442,283 B1 8/2002 Twefik et al.
6,983,057 B1 * 1/2006 Ho et al. ........................ 382/100
7,146,051 B2 * 12/2006 Kang et al. .................... 382/232
7,394,567 B2 7/2008 Chen
7,653,676 B2 * 1/2010 Su ................................ 708/404
2002/0116618 A1 8/2002 Muratani
2003/0020681 A1 * 1/2003 Arita et al. ...................... 345/88
2003/0128863 A1 * 7/2003 Hayashi ........................ 382/100
2004/0013284 A1 * 1/2004 Yu ................................ 382/100
2005/0146454 A1 * 7/2005 Wang ............................ 341/144
2005/0180594 A1 8/2005 Isogai
2005/0254693 A1 * 11/2005 Harkless et al. .............. 382/124
2006/0090114 A1 * 4/2006 Duffy et al. ................... 714/746
2007/0260660 A1 * 11/2007 Su ................................ 708/404

(Continued)

FOREIGN PATENT DOCUMENTS

JP 2005204036 7/2005

OTHER PUBLICATIONS

Yuk Ying Chung; A High Capacity Image Steganographic System; Nov. 17-19, 2005; WSEAS International Conference on Electronics, Control, and Signal Processing; 4$^{th}$; 1-5.*

(Continued)

*Primary Examiner* — Bradley Holder
*Assistant Examiner* — Fahimeh Mohammadi
(74) *Attorney, Agent, or Firm* — Brundidge & Stanger, P.C.

(57) ABSTRACT

A system and method for embedding data is provided. The method comprises dividing the host data set into a plurality of blocks, wherein each block comprises a plurality of elements, generating a pattern connecting the elements of each block; and embedding data on the elements of block based on the pattern.

6 Claims, 3 Drawing Sheets

(56) References Cited

U.S. PATENT DOCUMENTS

| | | | | |
|---|---|---|---|---|
| 2009/0022360 | A1 | 1/2009 | Bradley et al. | |
| 2009/0074241 | A1* | 3/2009 | Miller et al. | 382/100 |
| 2009/0174912 | A1* | 7/2009 | Asano | 358/474 |
| 2010/0052737 | A1* | 3/2010 | Lee | 327/108 |
| 2010/0306497 | A1* | 12/2010 | Farrugia et al. | 711/202 |

OTHER PUBLICATIONS

Yuk Ying Chung; A High Capacity Image Steganographic System; Nov. 17-19, 2005; WSEAS International Conference on Electronics, Control, and Signal Processing; 4th; 1-5.*

Yuk Ying Chung, A High Capacity Image Steganographic System, Nov. 17-19, 2005, WSEAS International Conference, pp. 70-74.*

Y.K.Lee et al., High capacity image steganographic model, Jun. 2000, IEEE, vol. 147, No. 3, pp. 288-294.*

Ali Al-Ataby et al., A Modified High Capacity Image Steganography Technique Based on Wavelet Transform, Oct. 2010, The International Arab Journal of Information Technology, vol. 7, No. 4, pp. 1-7.*

Dominik Heider et al., DNA-based watermarks using the DNA-Crypt algorithm, May 29, 2007, Bio Med Central, pp. 1-10.*

Aura, T., "Practical Invisibility in Cigital Communication," in proceedings of the Workshop on Information Hiding, Cambridge, England, May 1996, pp. 265-278, vol. 1174 of Lecture Notes in Computer Science, Springer 1996.

Bender, W., et al., "Techniques for Data Hiding," IBM Systems Journal, vol. 35, Issue 3-4 (1996), pp. 313-336.

Chan, C., et al., "Hiding Data in Images by Simple LSB Substitution," Pattern Recognition, vol. 37, Issue 3, Mar. 2004, pp. 469-474.

Provos, N., et al., "Hide and Seek: An Introduction to Steganography," IEEE Security and Privacy, vol. 1, No. 3, pp. 32-44, May 2003.

Marvel., L.M., et al., "Spread spectrum image steganography," IEEE Transactions on Image Processing, vol. 8, No. 8, pp. 1075-1083, Aug. 1999.

Yang, Cheng-Hsing, "Inverted Pattern Approach to Improve Image Quality of Information Hiding by LSB Substitution," Pattern Recognition, vol. 41, No. 8, pp. 2674-2683 (Aug. 2008).

International Search Report for PCT/IB2010/054086 mailed Jan. 5, 2011.

Chung, Y. Y., "A High Capacity Image Steganographic System," 4th WSEAS International Conference on Electronics, Control and Signal Processing, Miami, Florida, USA, Nov. 17-19, 2005 (pp. 70-74).

* cited by examiner

DATA EMBEDDING SYSTEM

CROSS REFERENCE TO RELATED APPLICATIONS

This application claims priority to Indian Patent Application Serial No. 703/CHE/2010 filed Mar. 17, 2010, the contents of which are incorporated by reference herein in its entirety.

BACKGROUND

In many applications, it is often required to transmit confidential information from one point to another. Specifically, when such information is transmitted over insecure communication channels, it is important to ensure that the information is not susceptible to being intercepted and/or tampered with.

Steganography refers to the science of concealing information using various techniques to allow important messages to be securely carried over insecure communications channels. Steganographic techniques have, in the past, been primarily associated with, for example, invisible inks, messages sent via telephone line noise, and red cellophane such as that used in games to reveal information hidden in a red-blue block. More recently, steganographic techniques have been used in the computer environment to hide information in graphical images, sound files, text files, or other media.

Steganography achieves confidentiality by camouflaging the confidential information inside a host data set such as an image. The confidential information is protected from intruders since it is difficult to identify or even recognize the information directly from the host data set. An authorized person may possess a key that permits the confidential information to be extracted from the host data set.

One important characteristic of a steganography process is imperceptibility. In other words, the existence of stenographically hidden information is not readily apparent from a review of the carrying media (such as an image). The media in which the message is hidden generally does not draw any attention to itself in a way that makes an intruder suspicious of hidden content. Thus, steganography hides information inside other messages in a way that does not allow detection.

An example steganography technique is described by Chi-Kwong Chan and L. M. Cheng in the paper "Hiding data in images by simple LSB substitution". The technique describes a data hiding scheme by simple least significant bit (LSB) substitution. An optimal pixel adjustment process (OPAP) is applied to the stego-image obtained by the simple LSB substitution method. This technique improves the image quality of the stego-image while reducing the computational complexity. In this method, the OPAP tries to vary the value of most significant bit (MSBi) next to kth bit up to which the secret data is embedded.

Another LSB based technique is described by Cheng-Hsing Yang in the paper "Inverted pattern approach to improve image quality of information hiding by LSB substitution". The technique is called the inverted pattern (IP) LSB substitution approach and is known to improve the quality of the stego-image. Each section of the secret image is determined to be inverted or not inverted before it is embedded. The decisions are recorded for the purpose of extracting data and the pattern can be seen as a secret key or as extra data to be re-embedded. However, since both techniques described above uses simple raster scans, the stego-image becomes easy to decrypt.

Another approach is described by Niels Provos and Peter Honeyman in the paper "Hide and Seek: An Introduction to Steganography". The paper describes a hide and seek software technique that randomly selects pixels in an image for embedding secret data and thus generating a stego-image. In addition, a stego key and a secure hash function are used to generate a sequence of unique pixel addresses for embedding. However, in these random approaches all pixels of the image are not used for hiding secret data which in turn affect the payload.

SUMMARY

Briefly, according to one embodiment of the present technique, a method for embedding data in a host data set is provided. The method comprises dividing the host data set into a plurality of blocks, wherein each block comprises a plurality of elements, generating a pattern connecting the elements of each block; and embedding data on the elements of the block based on the pattern.

In another embodiment, a system for transmitting and receiving a host data set is provided. The system comprises a transmitting device configured to divide the host data set into a plurality of blocks, wherein each block comprises a plurality of elements, shuffle the elements in each block based on a shuffling scheme and generate a pattern connecting the elements of each block. The pattern connects all the elements in each block at least once. The transmitting device is further configured to embed data on the elements of block based on the pattern and transmit the host data set, shuffling scheme and a pattern code.

In another embodiment, a system for embedding data in a host data set is provided. The system comprises a transmitting device configured to divide the host data set into a plurality of blocks, wherein each block comprises a plurality of elements, generate a pattern connecting the elements of each block and embed data on the elements of block based on the pattern.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
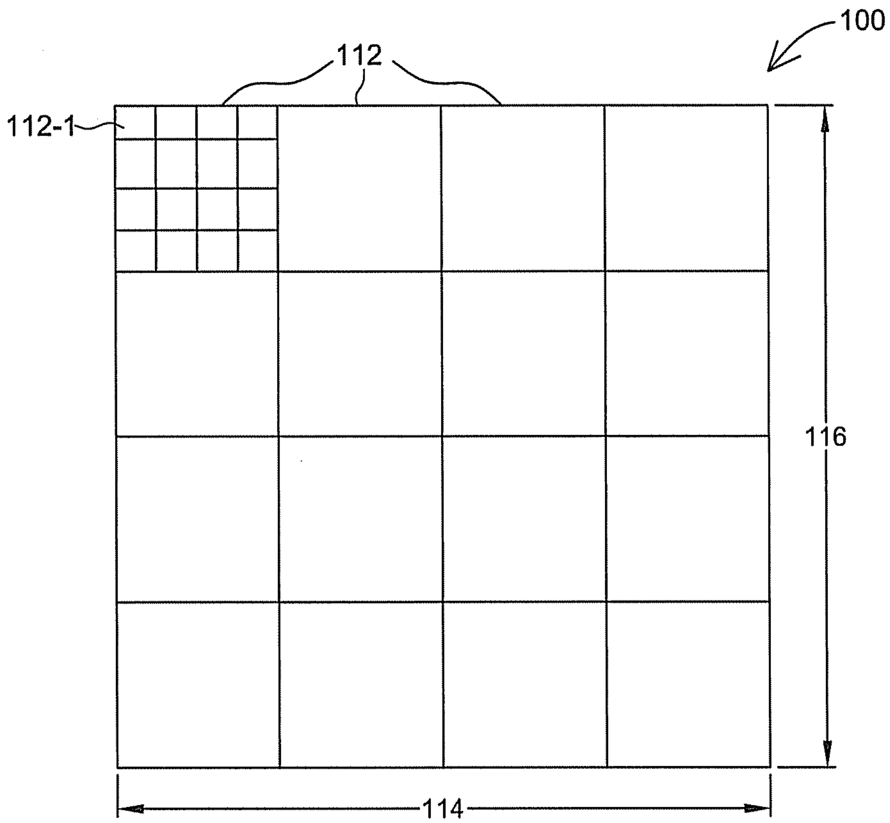
FIG. 1 is an example host data set used for embedding data according to one aspect of the present technique.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an example host data set used for embedding data according to one aspect of the present technique. Discrete pixel image 100 is produced via an imaging system (not shown) and is composed of a matrix of discrete pixels such as 112-1, disposed adjacent to one another in a series of rows and columns. Overall, these rows and columns of pixels provide a pre-established matrix width 114 and matrix height 116. Example matrix dimensions may include 256×256 pixels; 512×512 pixels; 1024×1024 pixels and so forth.

Each pixel includes information that is representative of a portion of an imaged object. The information is present in the form of intensity values. The intensity value for each pixel has a dynamic range, typically characterized in terms of a binary number, such as of 8 bits, 16 bits, and so forth.

The discrete pixel image 100 is divided into several blocks 112 as shown, and each block comprises a plurality of pixels like 112-1. In one embodiment, the block dimension is 4×4 pixels. In the illustrated embodiment, the blocks are of equal size; however it should be noted that the blocks may be of varying sizes as well. The manner in which data may be embedded in the discrete pixel image 100 is described in further detail below with reference to an example block.

Figure 2:
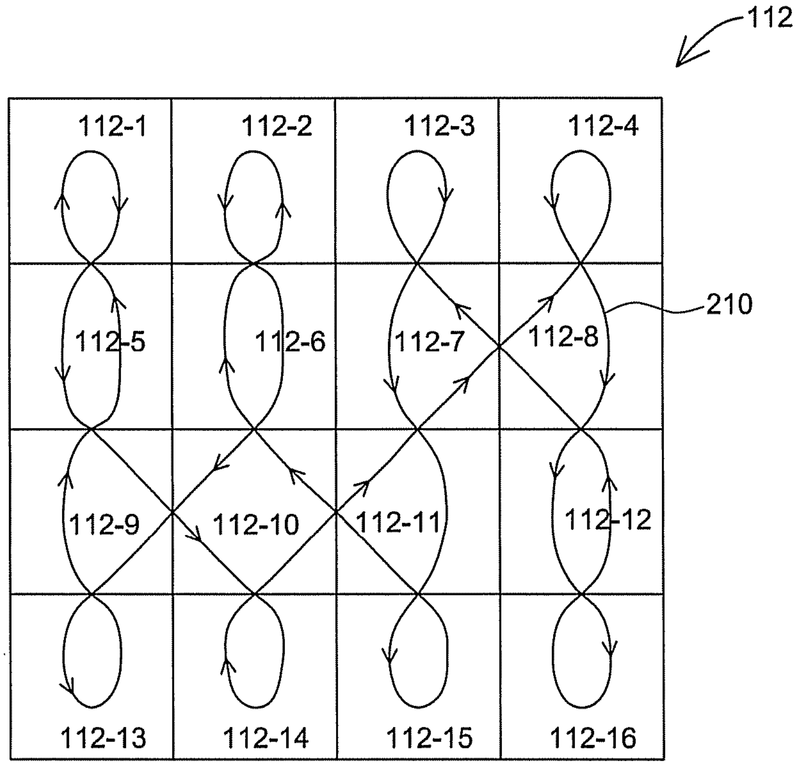
FIG. 2 is an example pattern connecting pixels in a block according to an aspect of the present invention.

FIG. 2 is an example block of pixels in a discrete pixel image. Block 112 includes 16 pixels, 112-1 through 112-16, arranged in the form a 4×4 matrix. In order to embed data, a pattern 210 is generated that connects the pixels in the block. In one embodiment, the pattern 210 connects all the pixels at least once.

In one embodiment, the pattern is a pulli kolam pattern. Pulli kolam is a form of sand painting that is drawn using rice powder and is practiced by Hindus in South India. A pulli kolam pattern has a stroke that runs once around each dot in a set of dots and ends at the same point the stroke began. In the example embodiment the pattern forms a mostly geometrical figure. In the above example, each pixel 112-1 through 112-16 represents a dot and the pattern 210 connects the pixels to form a geometrical figure. Data may be embedded in the pixels that the pattern connects.

Figure 3:
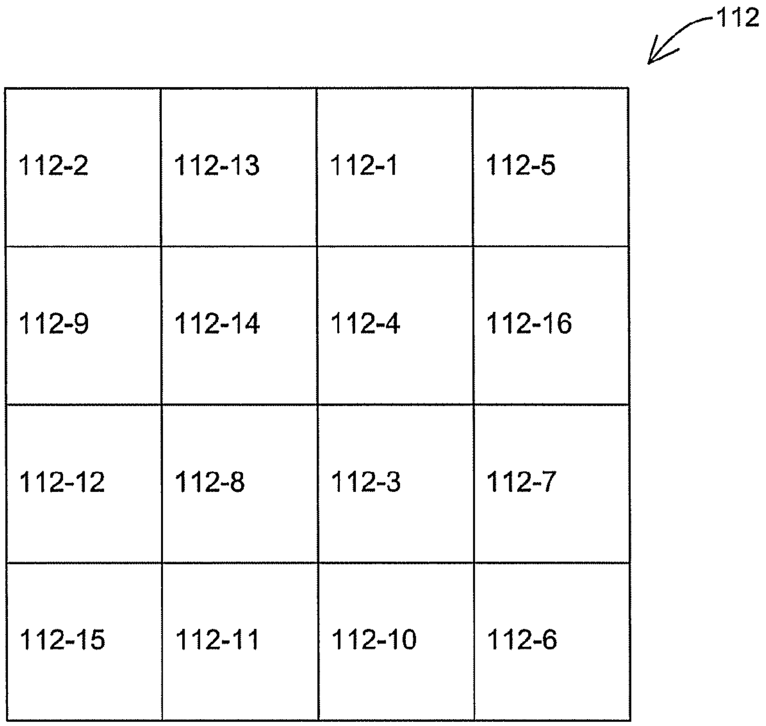
FIG. 3 is an example block illustrating a sequence by which data is embedded according to an example pattern.

For example, in the illustrated embodiment, the pattern begins at 112-2 and moves to 112-13. The path continues until it ends at 112-2. The block that is rearranged with respect to the path of the pattern is shown in FIG. 3. Thus, the data is embedded in the sequence on pixels 112-2,112-13,112-1, 112-5,112-9,112-14,112-4,112-16,112-12,112-8,112-3,112-7,112-15,112-11, 112-10 and 112-6. In one embodiment, the data is embedded in a least significant bit (LSB) of each pixel. In a more specific embodiment, the LSB is altered when the binary value of the data to be embedded in a pixel is different from the value of the LSB. When the value of the data to be embedded in the pixel is the same as the value of the LSB, no alteration is made to the LSB.

Similar patterns may be generated for all the blocks in the discrete image and data may be embedded as described above. The discrete image with the embedded data can then be transmitted to a receiving device. The manner in which the host data set with embedded data is transmitted is described in further detail below.

Figure 4:
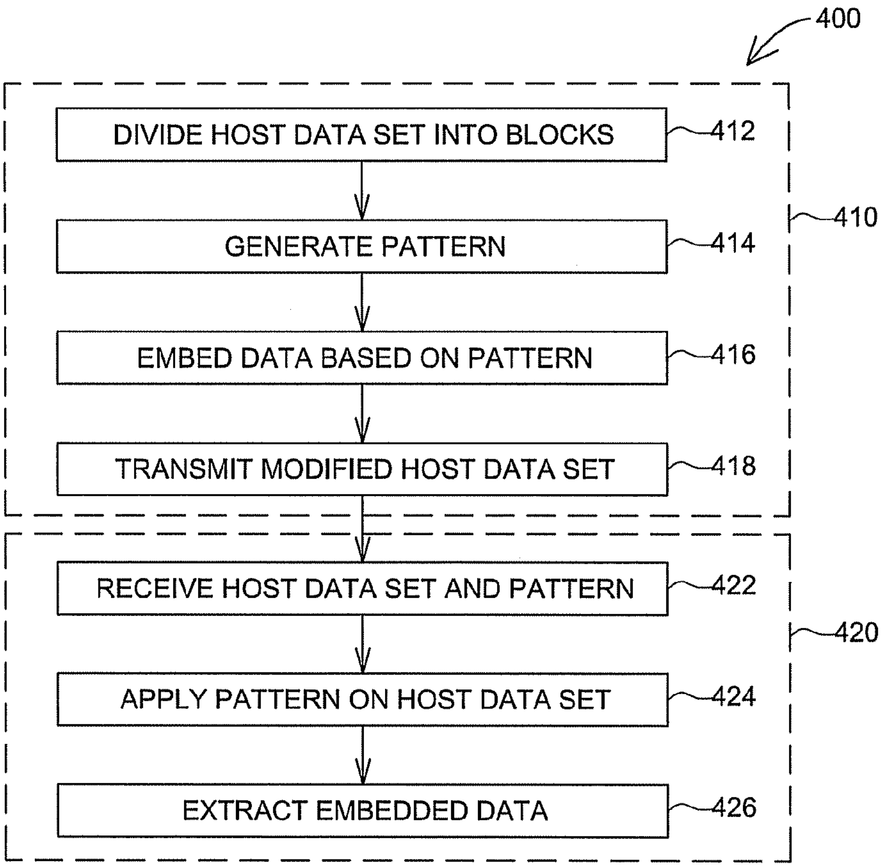
FIG. 4 is an example flow chart depicting one method by which data can be embedded in a host data set and transmitted.

FIG. 4 is a flow chart depicting one method by which data can be communicated securely over a non-secure channel. The method 400 is implemented in a system comprising a transmitting device 410 and a receiving device 420. Steps 412, 414, 416 and 418 are implemented in a transmitting device. Steps 422, 424 and 426 are implemented in a receiving device. Examples of the transmitting device and the receiving device include general purpose computers, handheld devices, mobile phones and the like.

The method 400 begins by dividing a host data set such as a discrete image into a number of blocks at step 412. As is described above, the blocks may be of equal size or of varying sizes. Each block comprises a plurality of elements. In one embodiment, the host data set is a discrete pixel image and the elements are pixels. In one embodiment, the discrete pixel image includes a video image. In a further embodiment, the data elements in the block are shuffled based on a shuffling scheme. In one embodiment, the shuffling scheme is based on a position of the data element in each block. In one embodiment, the position of the data element that is at an odd number is shuffled. In another embodiment, the position of the data element that is at an even number is shuffled. In another embodiment, the positions of all the data elements are shuffled using the shuffling scheme. In one embodiment, the shuffling scheme is also transmitted to the receiver device to enable the extraction of the embedded data from the host data set.

At step 414, a pattern is generated to connect the plurality of elements. In one embodiment, the pattern connects all the data elements at least once. In one embodiment, the generated pattern is based on the number of data elements in each block. At step 416, the data is embedded in the host data set. The data is embedded based on a path the pattern traverses while connecting the elements. In one embodiment, the data is embedded in the least significant bit of each pixel. In one embodiment, the pattern is a pulli kolam pattern.

At step 418, the host data set with the embedded data is transmitted. In one embodiment, a pattern code that identifies the pattern that was applied to the host data set is transmitted along with the modified host data set. In another embodiment, the pattern code is transmitted separately.

At step 422, the host data set and a pattern code is received at a receiving device. The pattern code is used to identify the pattern that was applied to the host data set when embedding data.

At step 424, the identified pattern is applied to the host data set. In one embodiment, the identified pattern is generated by the receiving device. In another embodiment, the identified pattern is selected from a set of patterns stored in the receiving device.

At step 426, the embedded data is extracted from the host data set. The data is extracted based from the pixels on a path that the pattern traverses. More specifically, the data is extracted from a least significant bit of each pixel that the pattern connects in the block.

The above described techniques provide several advantages including high imperceptibility. Specifically, while generating a stego-image, the peak signal to noise ratio is higher than about 33 dB indicating that the host image degradation is substantially low. Also, since the pulli kolam pattern connects every pixel in the host image, it would be complex to decrypt the embedded data within the host image.

Figure 5:
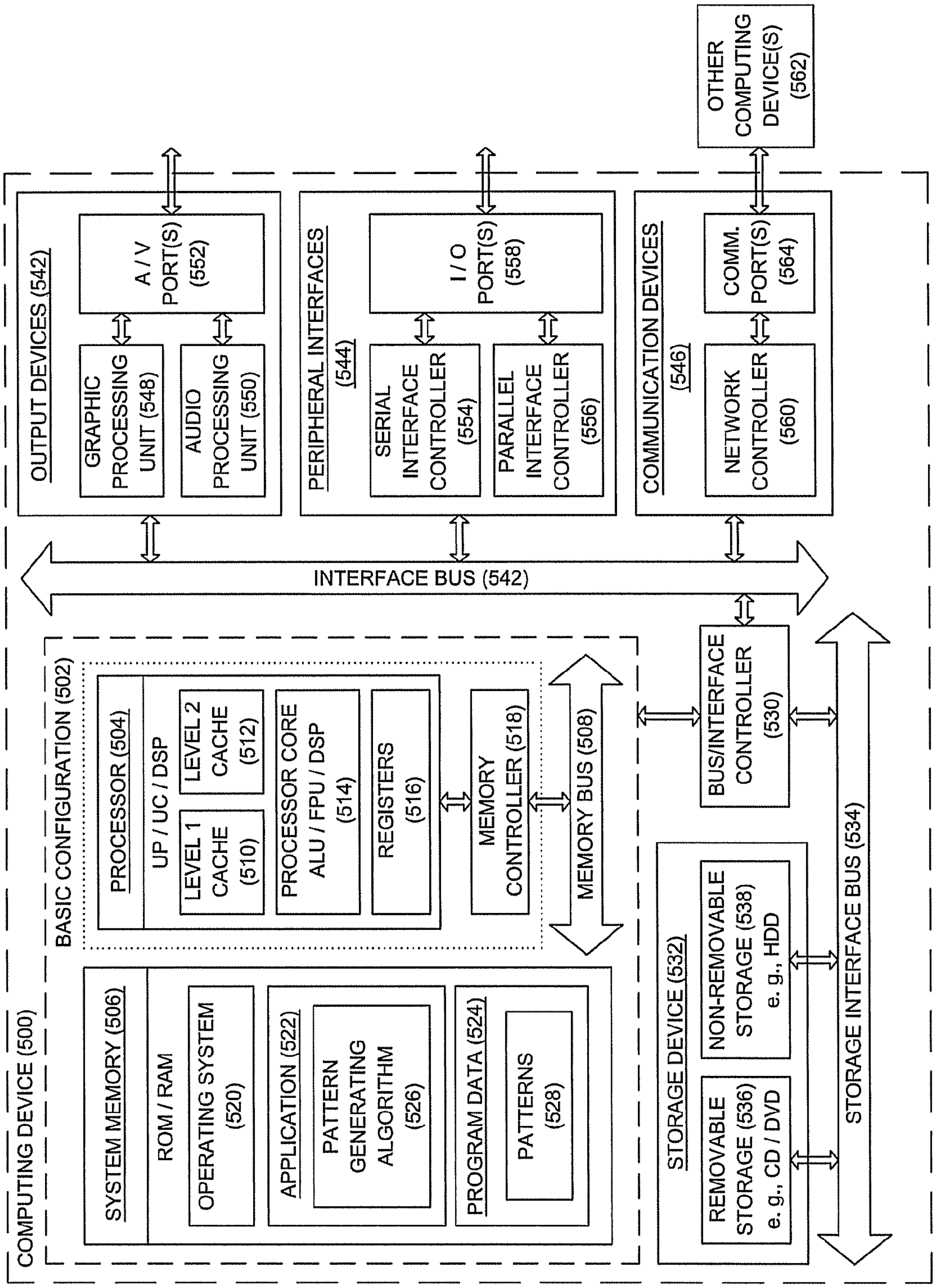
FIG. 5 is an example computing device used to embed data in a host data set.

FIG. 5 is a block diagram illustrating an example computing device 500 that may be used as a transmitting device and/or a receiving device to embed and extract data from a host data set in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a pattern generating algorithm 526 that is arranged to deter nine a median value in a set of values. Program data 524 may include patterns 528 that may be useful for various applications such as image processing as is described herein. In some embodiments, application 522 may be arranged to operate with program data 524 on operating system 520 such that a median value is determined for a set of values. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more AN ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application,, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, teens used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:

dividing, by a computer-based system, a host data set into a plurality of blocks, wherein a block of the plurality of blocks comprises a plurality of pixels, each pixel having an odd or even number position;

shuffling the plurality of pixels in the block having the odd number position according to a first shuffling scheme;

shuffling the plurality of pixels in the block having the even number position according to a second shuffling scheme;

generating, by the computer-based system, a pattern connecting the plurality of pixels in the block at least once to embed data; and responsive to the generating the pattern:

embedding, by the computer-based system, data in a least significant bit of each pixel of the plurality of pixels in the block based on the pattern, altering the least significant bit of each pixel of the plurality of pixels in the block in response to a binary value of the data differing from a value of the least significant bit, and transmitting, by the computer-based system, the pattern to a hardware receiving device.

2. The method of claim 1, further comprising transmitting, by the computer-based system, the host data set to the hardware receiving device.

3. The method of claim 1, further comprising:

receiving, by the computer-based system, the host data set and a pattern code;

determining, by the computer-based system, the pattern based on the pattern code; and applying, by the computer-based system, the pattern to the host data set to extract the embedded data from the divided host data set.

4. A computing device comprising:

a hardware transmitting device configured to:

divide a host data set into a plurality of blocks, wherein a block of the plurality of blocks comprises a plurality of pixels, each pixel having an odd or even number position;

shuffle the plurality of pixels in the block having the odd number position according to a first shuffling scheme;

shuffle the plurality of pixels in the block having the even number position according to a second shuffling scheme;

generate a pattern connecting the plurality of pixels in the block at least once to embed data; and responsive to the pattern generation:

embed data in a least significant bit of each pixel of the plurality of pixels in the block based on the pattern, alter the least significant bit of each pixel of the plurality of pixels in the block in response to a binary value of the data differing from a value of the least significant bit, and transmit the pattern to a hardware receiving device.

5. The computing device of claim 4, wherein the hardware receiving device is configured to:

receive the host data set, the first and second shuffling scheme and a pattern code;

determine the pattern based on the pattern code and the first and second shuffling scheme; and apply the pattern to the host data set to extract the embedded data from the host data set.

6. A computing device comprising:

a hardware receiving device configured to:

receive a host data set and a pattern code;

determine a pattern based on the pattern code, the pattern connecting a plurality of pixels in a block at least once to embed data, each pixel of the plurality of pixels having an odd or even number position, wherein the plurality of pixels having the odd number position are shuffled according to a first shuffling scheme, and wherein the plurality of pixels having the even number position are shuffled according to a second shuffling scheme;

apply the pattern to the host data set to extract embedded data from a least significant bit of each pixel that the pattern connects in the block; and recover the embedded data.

* * * * *